(12) United States Patent
Chiu et al.

(10) Patent No.: US 7,237,750 B2
(45) Date of Patent: Jul. 3, 2007

(54) AUTONOMOUS, BACK-PACKABLE COMPUTER-CONTROLLED BREAKAWAY UNMANNED AERIAL VEHICLE (UAV)

(75) Inventors: Tien Seng Chiu, Easton, MD (US); Jay Willmott, Silver Spring, MD (US)

(73) Assignee: L3 Communications, Easton, MD (US)

( * ) Notice: Subject to any disclaimer, the term of this patent is extended or adjusted under 35 U.S.C. 154(b) by 0 days.

(21) Appl. No.: 10/976,153

(22) Filed: Oct. 29, 2004

(65) Prior Publication Data

US 2006/0091258 A1  May 4, 2006

(51) Int. Cl.
  *B64C 1/00*  (2006.01)
(52) U.S. Cl. ..................................... 244/119
(58) Field of Classification Search ............ 244/117 R, 244/118.2, 119, 120, 131, 2, 1 R; 446/30–69
  See application file for complete search history.

(56) References Cited

U.S. PATENT DOCUMENTS 3,177,612 A * 4/1965 Giossi .......................... 445/64
3,286,630 A * 11/1966 Salmirs et al. .............. 102/377
5,035,382 A * 7/1991 Lissaman et al. ........... 244/190
5,779,190 A   7/1998 Rambo et al.
6,612,893 B2  9/2003 Rehkemper et al.
6,685,140 B2  2/2004 Carroll
6,726,148 B2  4/2004 Carroll
2003/0060943 A1  3/2003 Carroll
2003/0066932 A1  4/2003 Carroll
2005/0258310 A1* 11/2005 Bilyk et al. ............. 244/138 R

* cited by examiner

*Primary Examiner*—Teri Pham Luu
*Assistant Examiner*—Stephen A Holzen
(74) *Attorney, Agent, or Firm*—Jacobson Holman PLLC

(57) ABSTRACT

A modular unmanned aerial vehicle (UAV) having a fuselage, a nose cone, a left wing piece, a right wing piece, and a tail section. The tail section and nose cone each join to the fuselage through mating bulkhead structures that provide quick connection capability while being readily separated so as to enable the UAV to break apart at these connection points and thereby absorb or dissipate impact upon landing. The UAV is capable of rapid assembly in the field for two-man launch and data retrieval, as well as quick disassembly into these five component parts for transport and storage in a highly compact transport case that can be carried as a backpack.

20 Claims, 16 Drawing Sheets

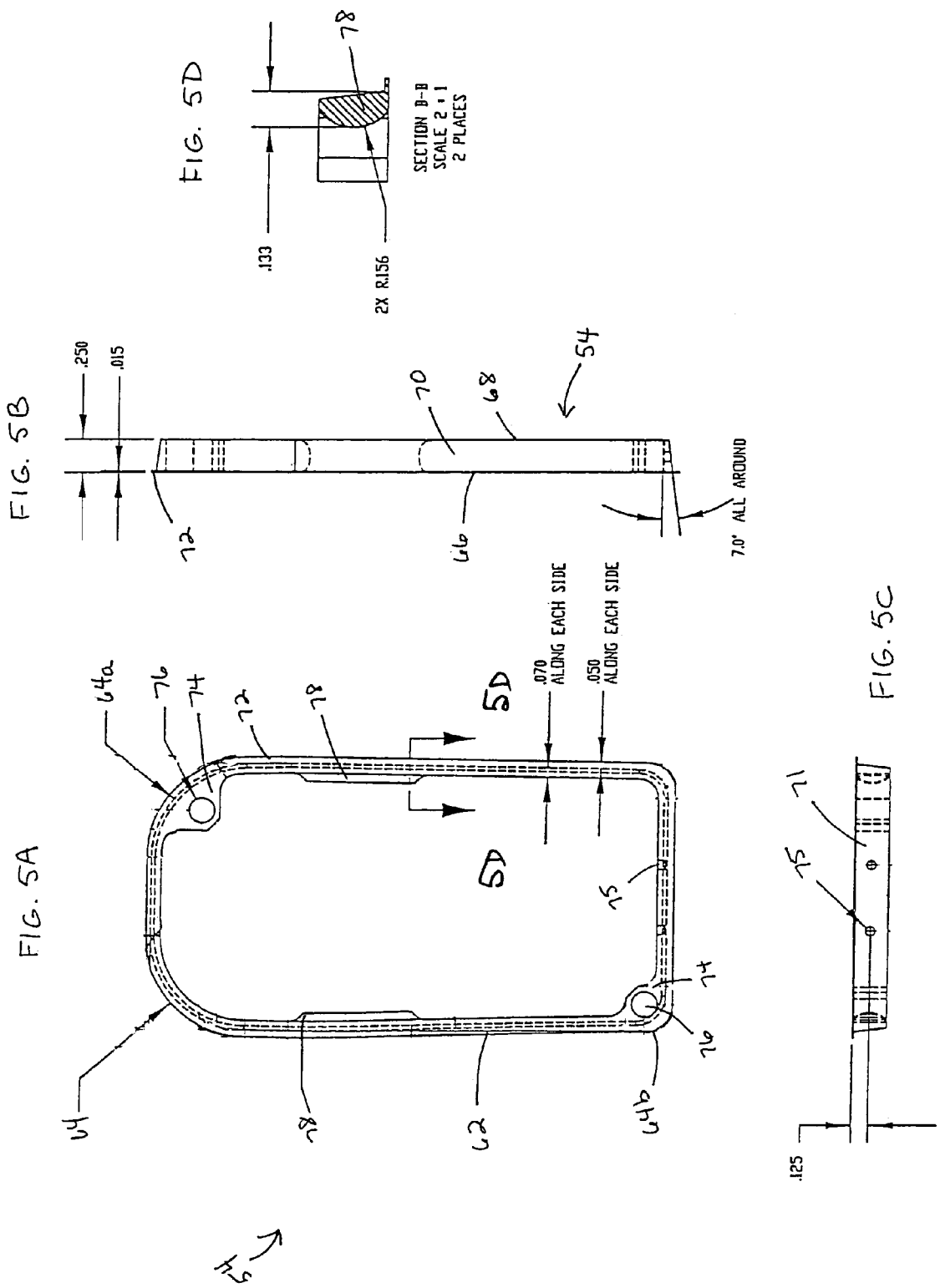

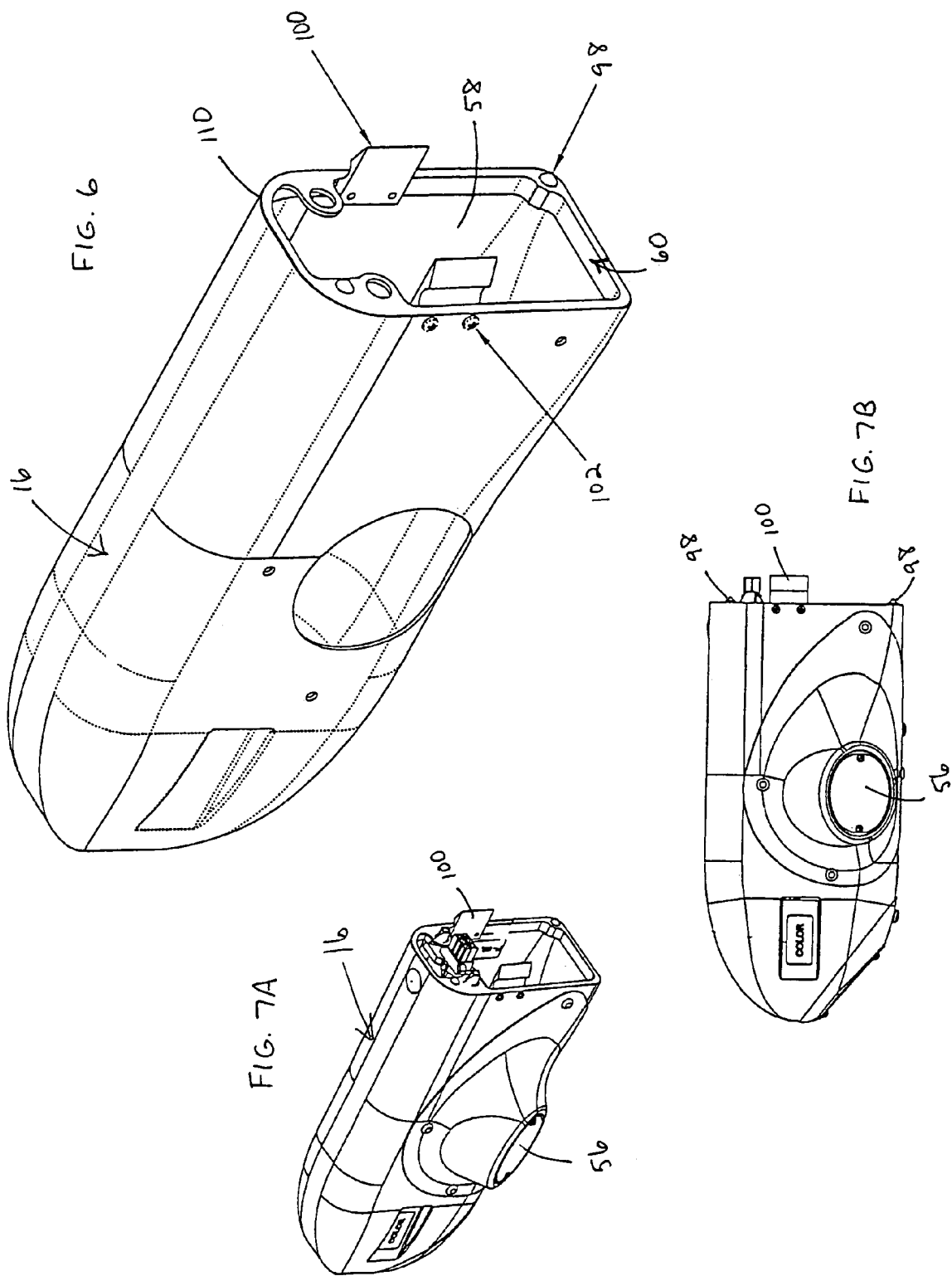

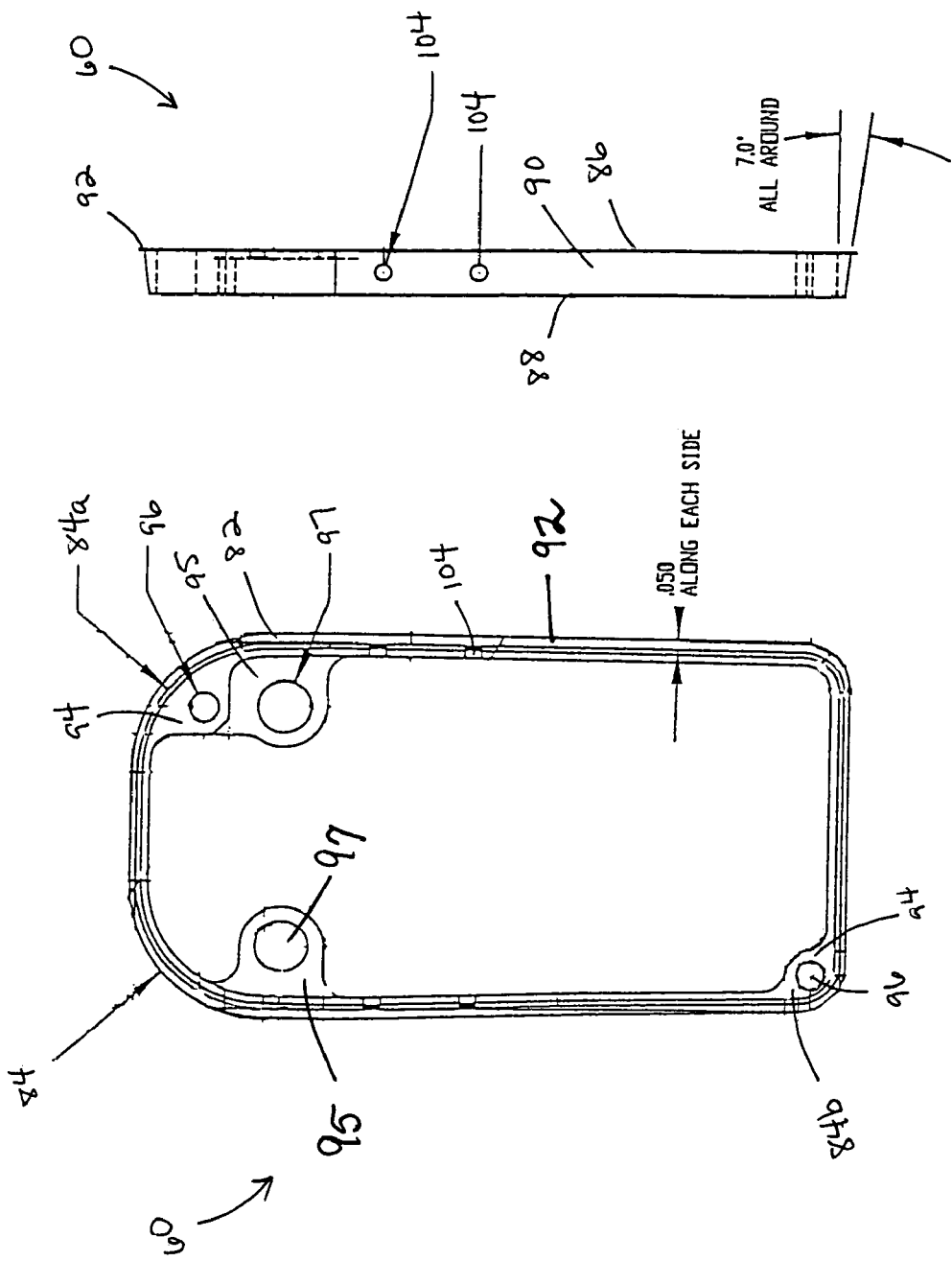

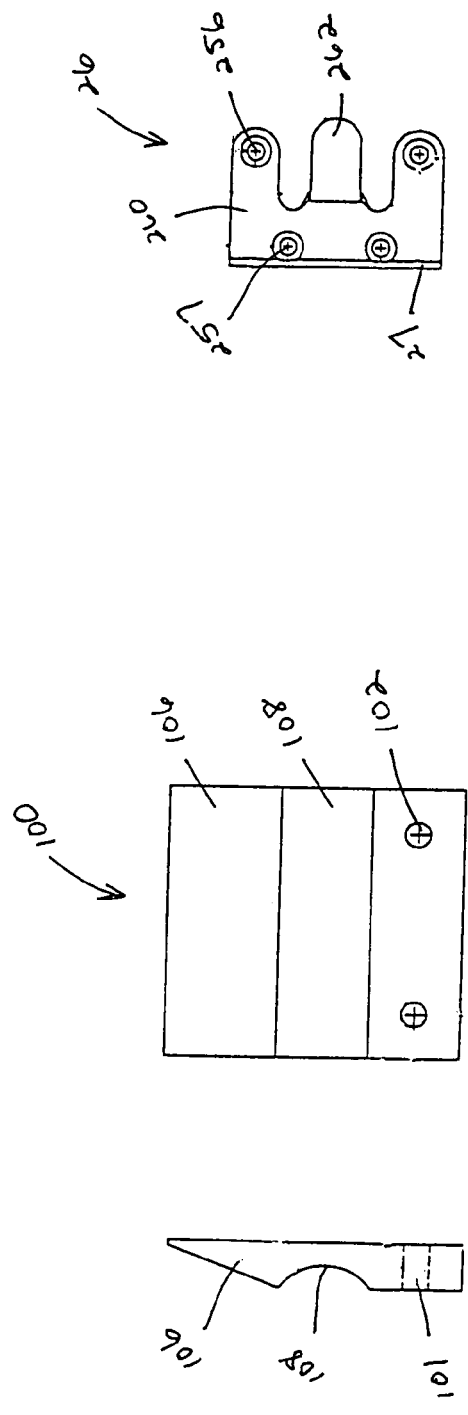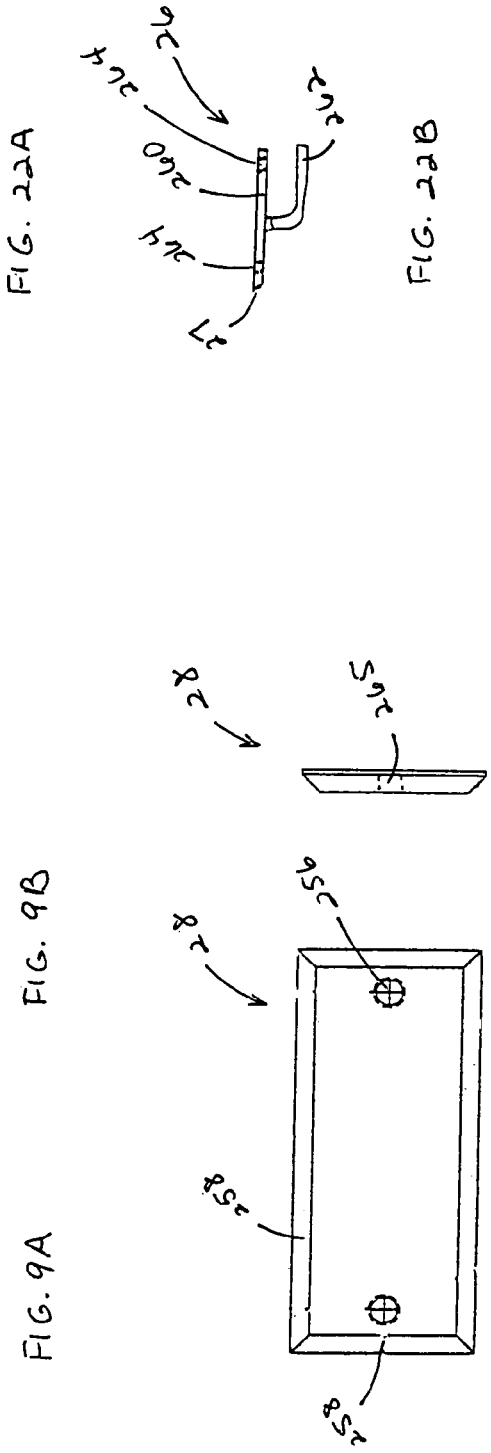

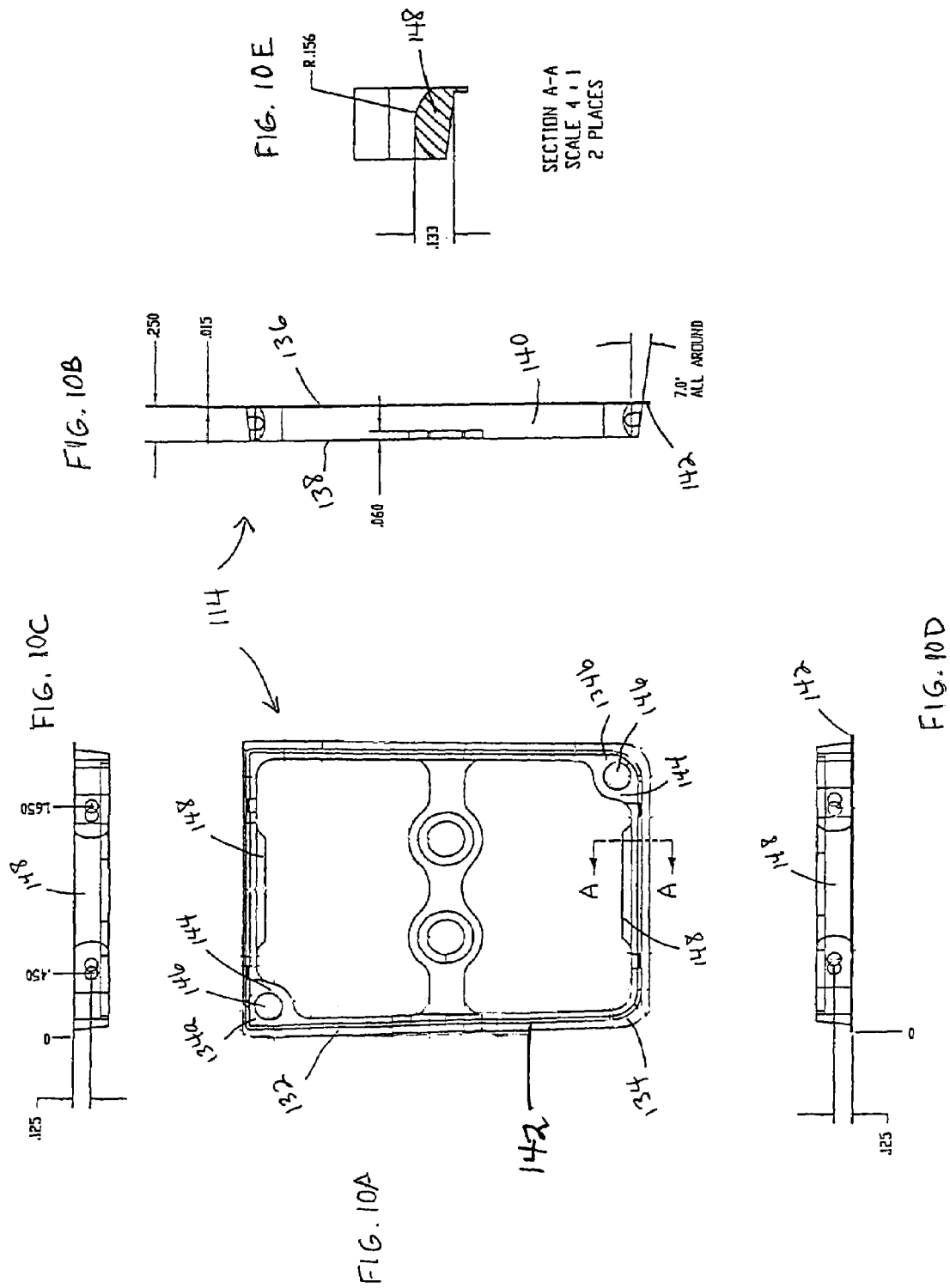

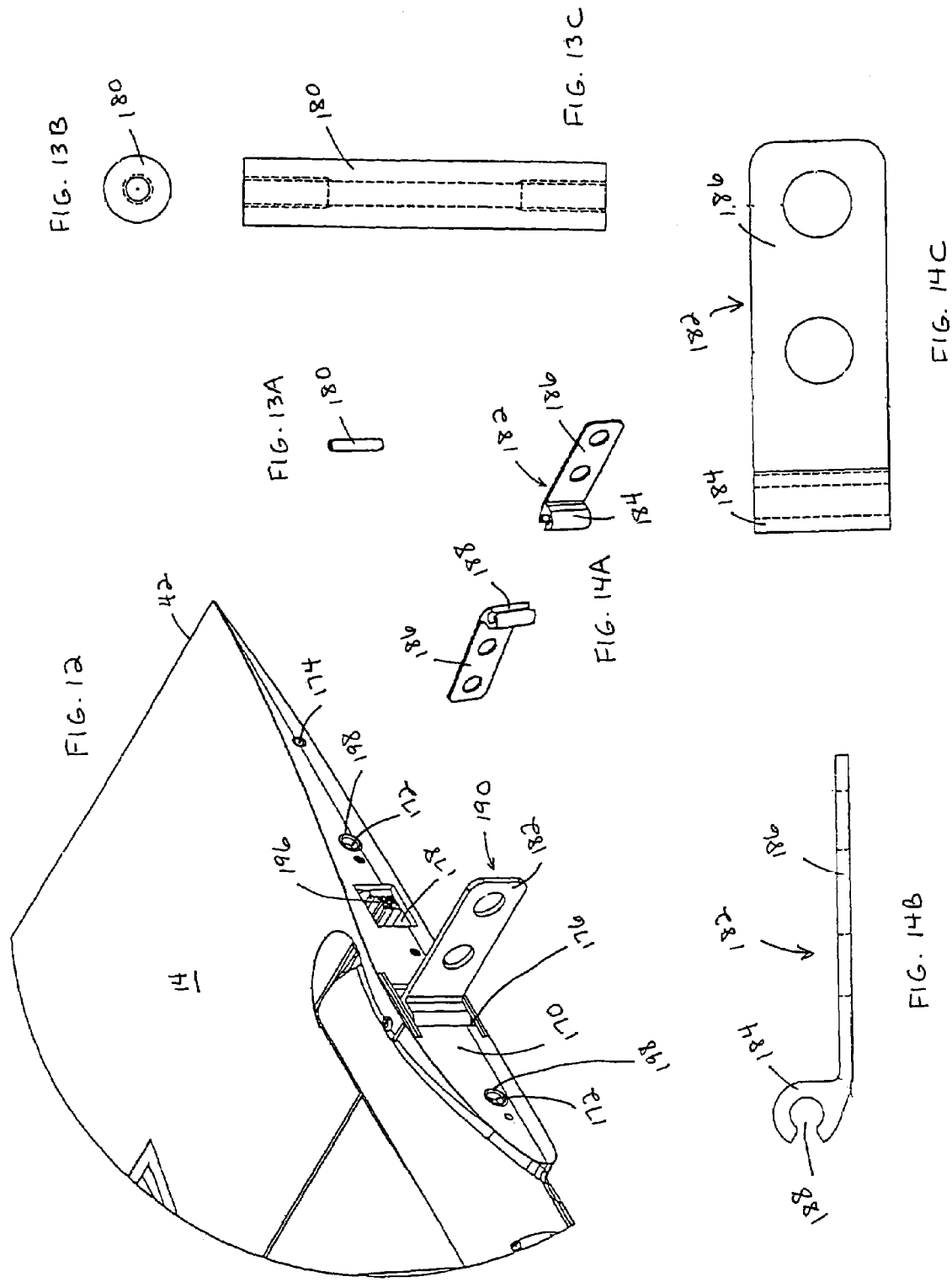

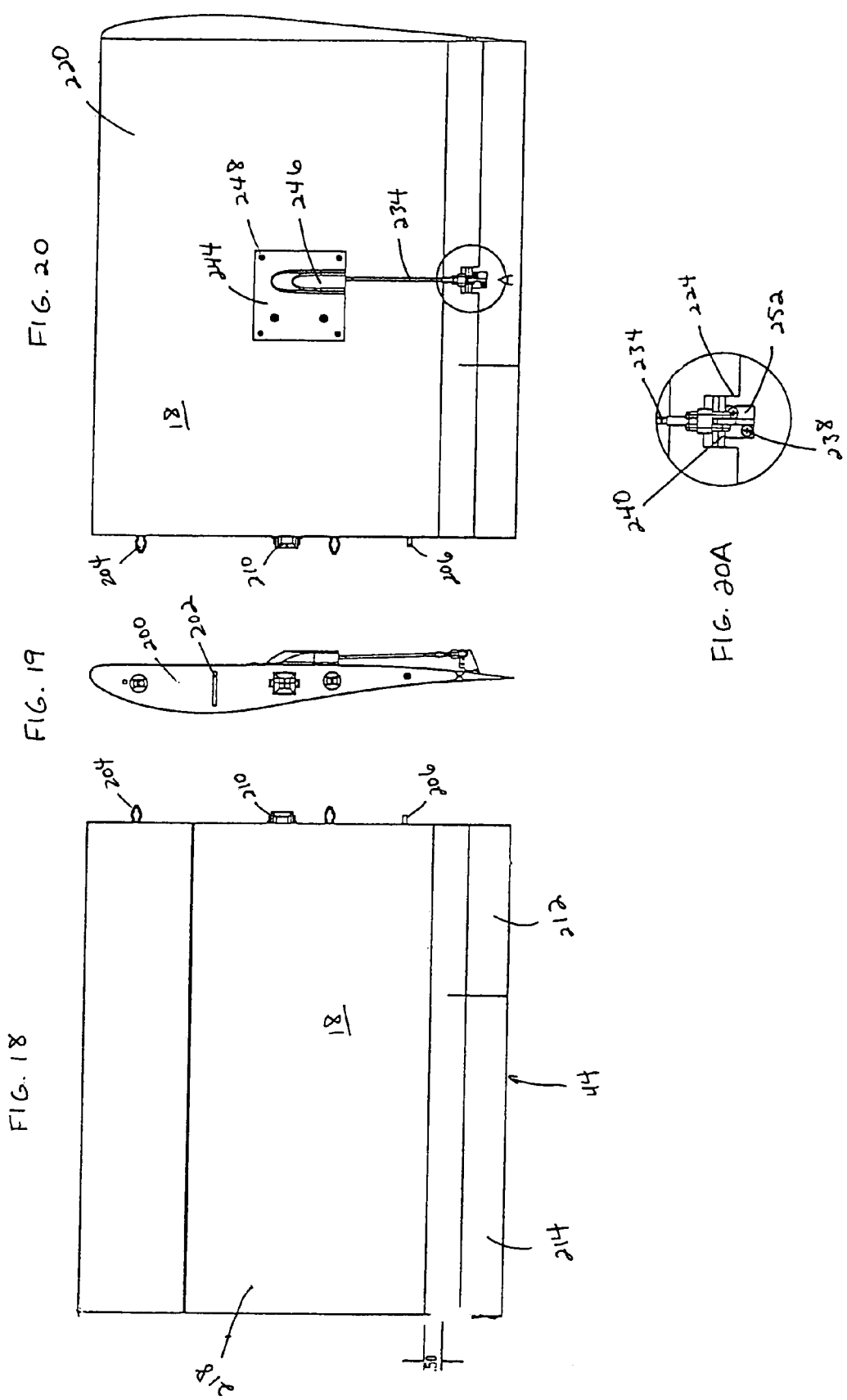

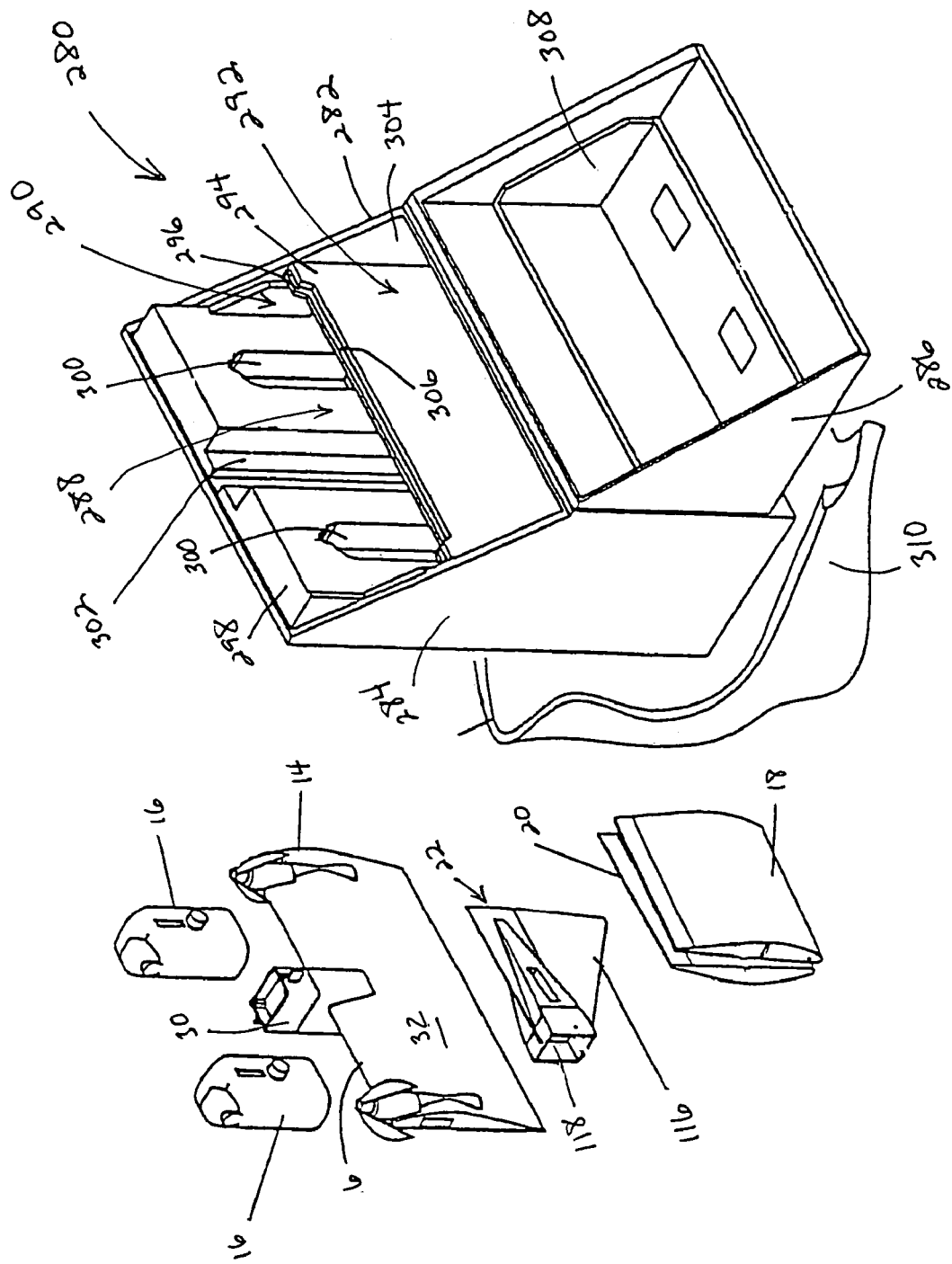

AUTONOMOUS, BACK-PACKABLE COMPUTER-CONTROLLED BREAKAWAY UNMANNED AERIAL VEHICLE (UAV)

BACKGROUND OF THE INVENTION

1. Field of the Invention

The present invention relates generally to unmanned aircraft and, more particularly to a hand-launchable unmanned aerial vehicle (UAV) carrying sensor instrumentation for terrain surveillance, in which the components of the UAV are easily assembled in the field, can absorb landing shocks, and can be disassembled so as to fit in a small size package.

2. Description of the Related Art

There is a need for a small size unmanned aerial vehicle (UAV) which is able to collect data from a sensor such as a television camera carried on board the UAV and transmit the collected data to be received by a ground receiver, as for example at the point of launch.

Such a UAV must be capable of being disassembled, transported in a small size container to the point of launch, then quickly reassembled and launched, for data retrieval. With known UAV designs, the assembly process is often slowed due to the nature of the component connection elements which are often difficult to align and which can appear to be connected properly when in fact, the components are slightly out of alignment.

Once in flight, conventional UAV wing designs in which the servos controlling the elevons are mounted on the fuselage often cause the UAV to oscillate, resulting in instability that can negatively impact the data gathering mission.

Further difficulties often arise when the UAV returns upon completion of a surveillance mission, in that the landing process frequently results in considerable damage to the airframe of the UAV. This damage typically results when one of the wings is caught or collides with a ground-based object, twisting the airframe and tearing the wings and/or fuselage. Damage to the UAV may also occur as a result of the abruptness of the landing which can be caused when the launching clip tunnels into a soft ground surface, acting like an anchor and causing the UAV to flip or tumble rather than skidding on its belly.

Therefore, a need exists for an UAV that is constructed to absorb or dissipate the impact of landing without sustaining damage to a degree that would prevent nearly immediate redeployment, i.e., reuse while still in the field. The UAV must also be readily assembled and disassembled, with positively connecting components that provide fast and foolproof connection in a mission environment using a minimum of tools and requiring minimal operator training. Finally, the UAV must be constructed to have a low "ground adhesion" characteristic to further reduce shock and to maintain a steady airframe skid orientation upon landing.

SUMMARY OF THE INVENTION

It is therefore an object of the present invention to provide an unmanned aerial vehicle (UAV) which overcomes the problems in prior art vehicles and meets the needs described above. Accordingly, the present invention is directed to a modular UAV having a fuselage, a nose cone, a left wing piece, a right wing piece, and a tail section, the UAV being capable of rapid assembly in the field for two-man launch and data retrieval, as well as quick dissassembly into these five component parts for transport and storage.

The tail section and nose cone each join to the fuselage through mating bulkhead structures that provide quick connection capability. Each of these bulkhead connectors has a flat inner surface and a flat outer surface joined by a side wall. As used herein in describing the bulkheads, "outer" refers to that side of the bulkhead which interfaces with a corresponding bulkhead, while "inner" refers to that side which is rigidly mounted into an airframe component part.

The outer surface of each bulkhead connector has an integrally formed lip that extends outwardly on the same plane therewith. When the bulkhead is mounted to a corresponding through-hole in the nose cone, fuselage or tail section, the side wall of the bulkhead is juxtaposed against an inner surface of the through-hole while the lip abuts the edge of the through-hole.

Mating bulkhead connectors have complementary alignment structures to ensure rapid and precise connection. Upon impact, these connections are readily separated, enabling the UAV to break apart at these connection points and thereby absorb or dissipate the shock forces experienced as a result of landing.

The wing pieces are also constructed to facilitate breakaway from the fuselage without damage to the components themselves. The wing pieces are mounted on wing spars that are hingedly connected to the fuselage so as to move from a flush position against the fuselage when the wing pieces are removed, to an extended position for securing of the wing pieces for flight. The wing-mounting surface of the fuselage is further provided with a plurality of alignment apertures to receive corresponding projections on the fuselage-mounting surface of the wing pieces. The spars and projections have full breakaway capability so as to minimize damage to the fuselage and wing pieces upon impact. Electrical connections between the wing pieces and fuselage are also readily separated without damage.

The wing pieces are further provided with servo assemblies respectively mounted thereon to enhance elevon control and flight stability. With the servo secured to the lower surface of the wing piece and the control horn positioned on the elevon, the push-rod is short and direct, providing more responsive control and reducing flight oscillation.

The UAV of the present invention is further provided with an improved low profile launching clip having a beveled forward edge that acts as a skid upon landing so as to avoid rapid deceleration and damage to the UAV resulting therefrom. The clip is further secured to the fuselage bulkhead for greater structural strength without additional weight.

Accordingly, it is an object of the present invention to provide a breakaway construction for a UAV such that the UAV readily separates into multiple component parts upon the impact of landing with minimal damage to the component parts.

It is another object of the present invention to provide a breakaway surveillance UAV with bulkhead coupling mechanisms to join the component parts that are easy to connect and secure in use, and yet are readily separated, either manually or in response to torsional forces such as upon ground impact.

It is yet another object of the present invention to provide a breakaway surveillance UAV with detachable wing pieces that are secured with a spar assembly that is fully replaceable in the field.

It is still another object of the present invention to provide a UAV having wing-mounted servo assemblies that enhance flight control and stability.

It is a still further object of the present invention to provide a hand-launched surveillance UAV with an improved launching clip that facilitates aircraft skid upon landing.

It is another object of the present invention to provide a modular, highly transportable, hand-launched UAV that is not complex in assembly and which can be carried compactly in a disassembled state for field deployment.

These together with other objects and advantages which will become subsequently apparent reside in the details of construction and operation as more fully hereinafter described and claimed, reference being had to the accompanying drawings forming a part hereof, wherein like numerals refer to like parts throughout. The drawings are intended only to illustrate the present invention and should not be considered to scale.

BRIEF DESCRIPTION OF THE DRAWINGS

FIGS. 5A-5D are the outer, side, top and partial cross-sectional views, respectively, of the front fuselage bulkhead for the fuselage shown in FIG. 4A;

FIG. 6 is a rear perspective view of the nose cone with a nose cone bulkhead installed therein in accordance with the present invention;

FIGS. 7A and 7B are rear perspective and side views, respectively, of the nose cone shown in FIG. 6 with the payload and wiring installed therein;

FIGS. 8A and 8B are the inner and side views, respectively, of the nose cone bulkhead for the nose cone shown in FIG. 6;

FIGS. 9A and 9B are top and side views, respectively, of the clips used to secure the mating bulkhead pairs in accordance with the present invention;

FIGS. 10A-10E are the inner, side, top, bottom and partial cross-sectional views, respectively, of the rear fuselage bulkhead for the fuselage shown in FIG. 4B;

FIG. 12 is an enlarged view of the wing-mounting surface of the fuselage of the UAV shown in FIGS. 2, 4A and 4B in accordance with the present invention;

FIGS. 13A-13C are perspective, top and side views, respectively, of the spar pivot mounting rod of the UAV fuselage shown in FIGS. 2, 4A and 4B in accordance with the present invention;

FIGS. 14A-14C illustrate perspective, top and side views, respectively, of the stub spar for connection of the wing pieces shown in FIG. 2 to the spar pivot mounting rods of FIGS. 13A-13C;

FIG. 18 is a top view of the wing piece of FIG. 17;

FIG. 19 is a side assembled view of the wing piece with servo assembly of FIG. 17;

FIG. 20 is a bottom assembled view of the wing piece with servo assembly of FIG. 17;

FIG. 20A is an enlarged view of detail A of FIG. 20;

FIGS. 21A and 21B are detailed views of the mounting plate for the launch clip for the UAV as shown in FIG. 2 and FIG. 4A;

FIGS. 22A and 22B are plan and side views of the launch clip for the UAV as shown in FIG. 2;

FIG. 25 illustrates a perspective view of a second embodiment of a transport case for storage of the UAV, shown with the component parts of the UAV as disassembled and ready for storage in accordance with the present invention.

DETAILED DESCRIPTION OF THE PREFERRED EMBODIMENTS

Figure 1:
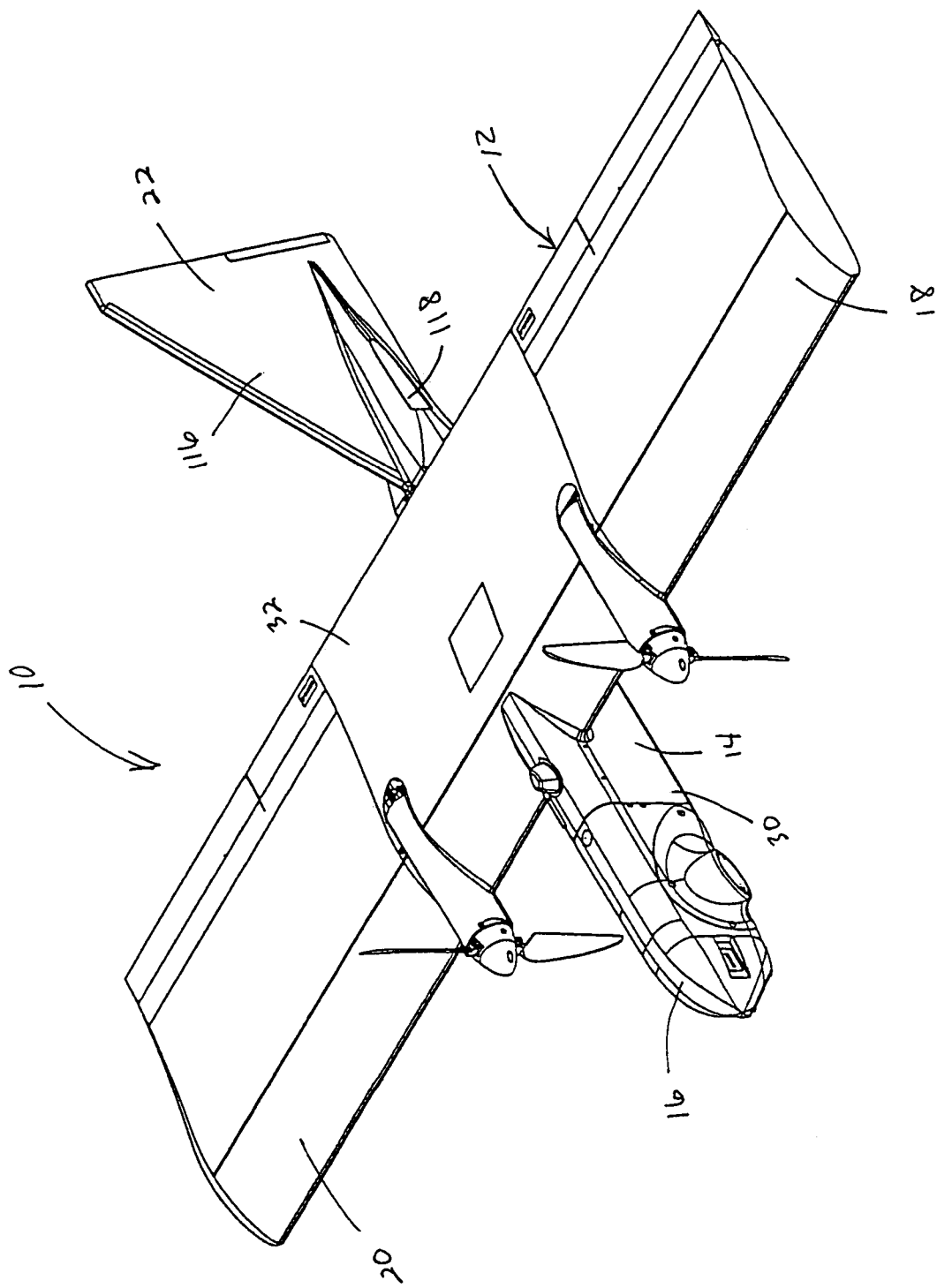
FIG. 1 is a perspective view of an UAV in accordance with the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

As illustrated in FIG. 1, the present invention is directed to an unmanned aerial vehicle (UAV), generally designated by the reference numeral 10, having an airframe which carries the vehicle in the air. The airframe, generally designated by the reference numeral 12, is preferably made of a composite material, and provides a means to generate lift and other aerodynamic forces necessary for the flight of the UAV. The airframe also provides an enclosure in which to mount and protect the other pieces of equipment (e.g., battery, guidance and control system, payload) necessary to operate the UAV.

Figure 2:
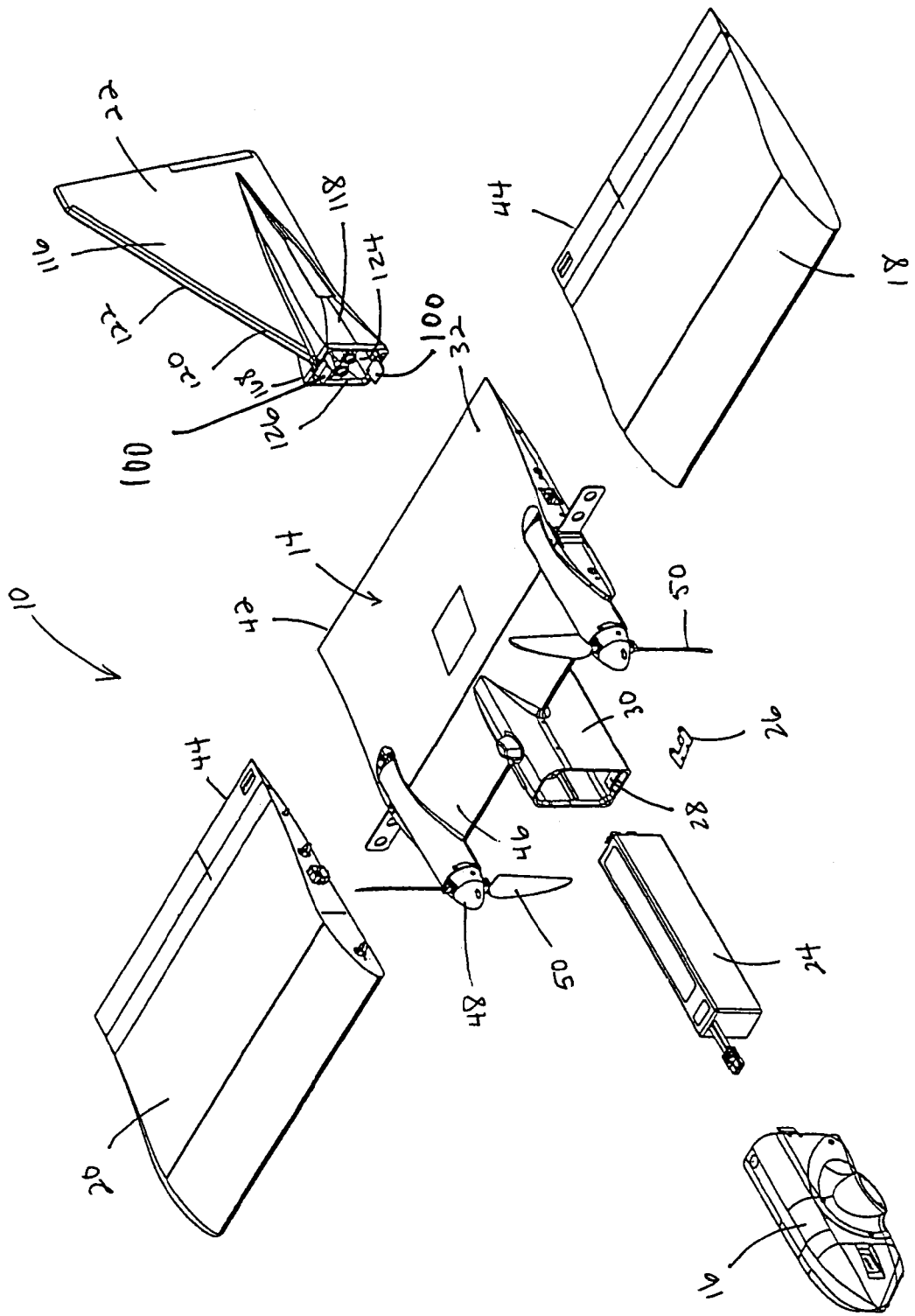
FIG. 2 is an exploded perspective view of the UAV of FIG. 1.

As shown in FIG. 2, the airframe 12 includes five readily separable component parts, namely a fuselage generally designated by the reference numeral 14, a nose cone generally designated by the reference numeral 16, a left wing section generally designated by the reference numeral 18, a right wing section generally designated by the reference numeral 20, and a tail section generally designated by the reference numeral 22. Fitted within the fuselage 14 of the airframe 12 is a battery pack 24 that provides power to the UAV 10, and connected to the underside of the fuselage 14 is a launch clip 26 secured through the fuselage to a mounting plate 28. Each of the five component parts 14, 16, 18, 20 and 22 is factory built and fully interchangeable with a similar component part when repair and/or replacement is required. The battery power source 24 preferably includes open-source primary lithium battery packs.

Figure 3:
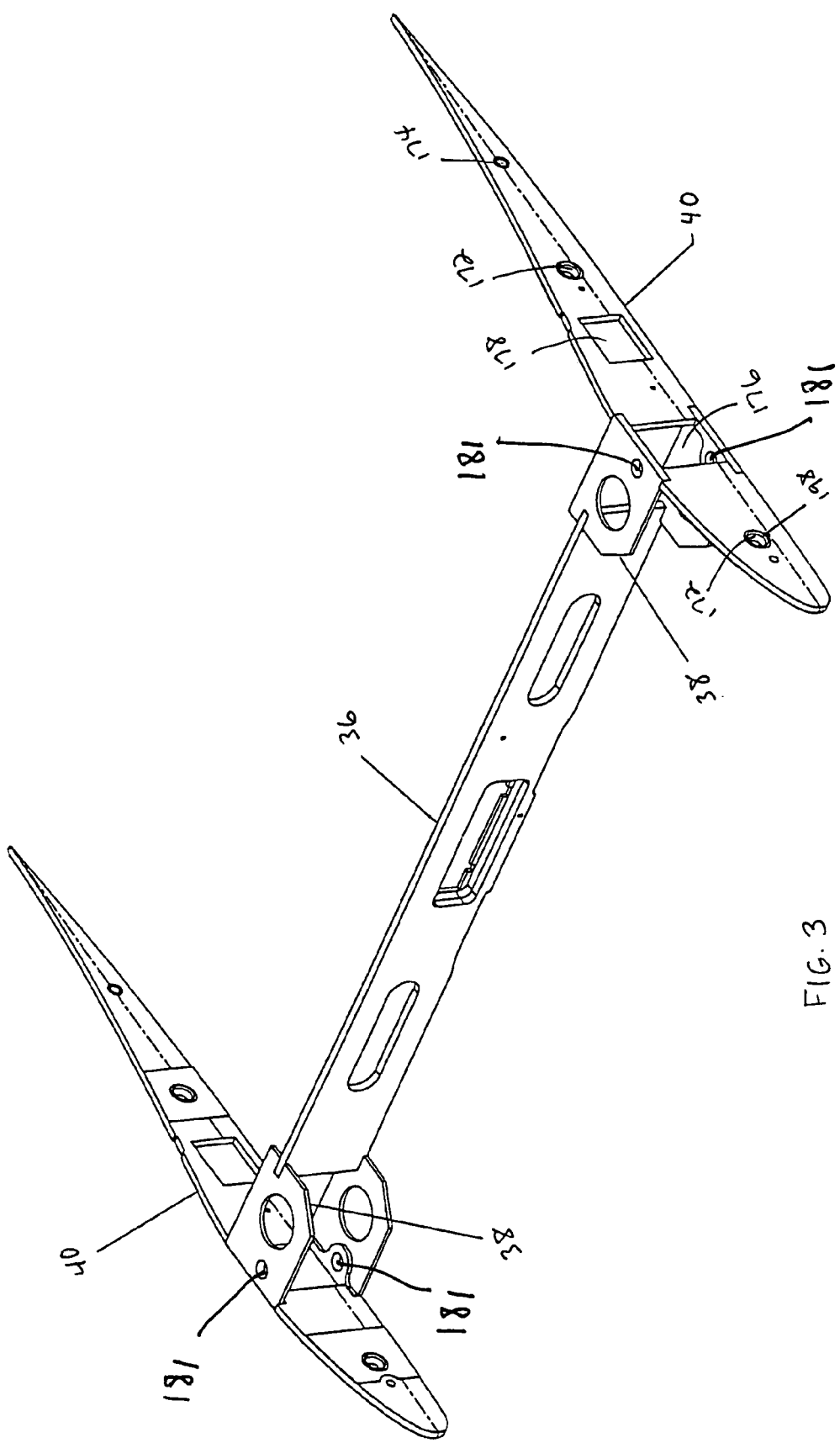
FIG. 3 is a perspective view of a spar/rib assembly for the fuselage of the UAV shown in FIG. 2.

The fuselage 14 has a longitudinally extending central body portion 30 and a wing-connecting portion 32 that is attached thereto or integral therewith. The wing-connecting portion 32 is built upon an inner spar/rib assembly, generally designated by the reference numeral 34, as shown in FIG. 3.

This assembly 34 includes a transverse main or central spar assembly 36 and, on each side, a stub spar mount 38 and a longitudinally extending inner wing rib assembly 40. The thickness of the wing-connecting portion 32, as defined by the inner wing rib assembly 40, diminishes toward the rear edge 42 thereof so as to correspond with the trailing edge 44 of the wing sections 18 and 20, which are coupled to the wing-connecting portion 32 on each side.

The rear side of the fuselage central body portion 30 is coupled to the tail section 22, while the front side of the fuselage central body portion 30 is coupled to the nose cone 16, as shown in FIG. 2. The front or leading edge 46 of the wing-connecting portion 32 of the fuselage 14 is provided with propulsion elements such as a pair of propellers 48, one on each side of the central body portion 30. The prop blades 50 of the propellers 48 are preferably pivotally mounted so as to have an outwardly extending operational position, as shown in FIGS. 1 and 2, and a rearwardly folded storage position, as shown in FIGS. 4A and 4B.

Figure 4A:
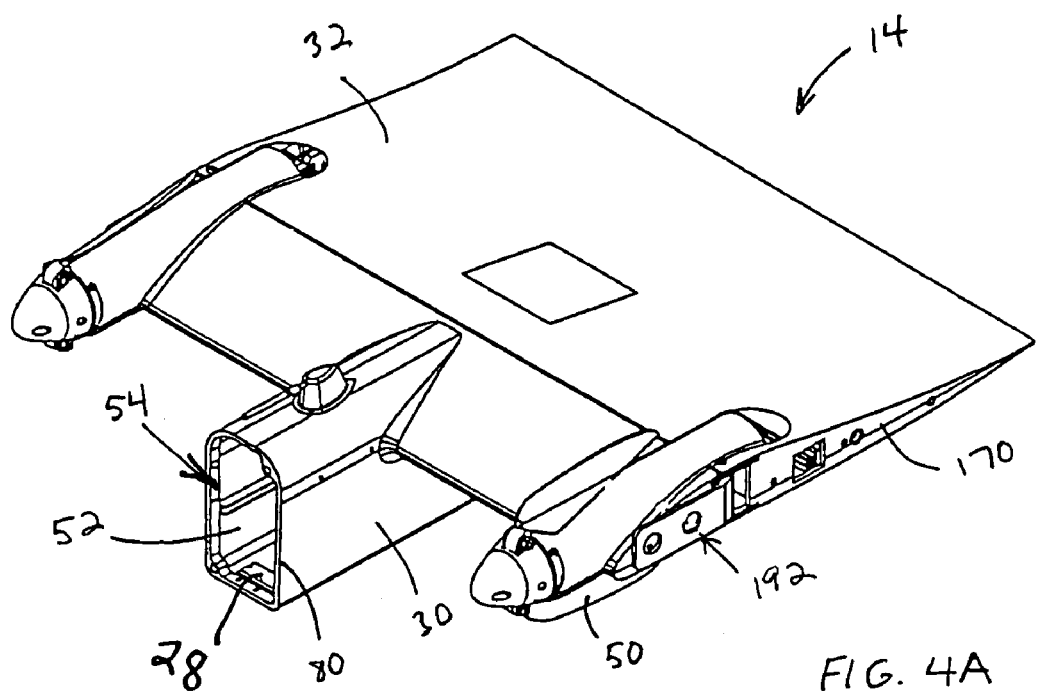
FIGS. 4A and 4B are front and rear perspective views, respectively, of the fuselage of the UAV shown in FIG. 2.
Figure 4B:
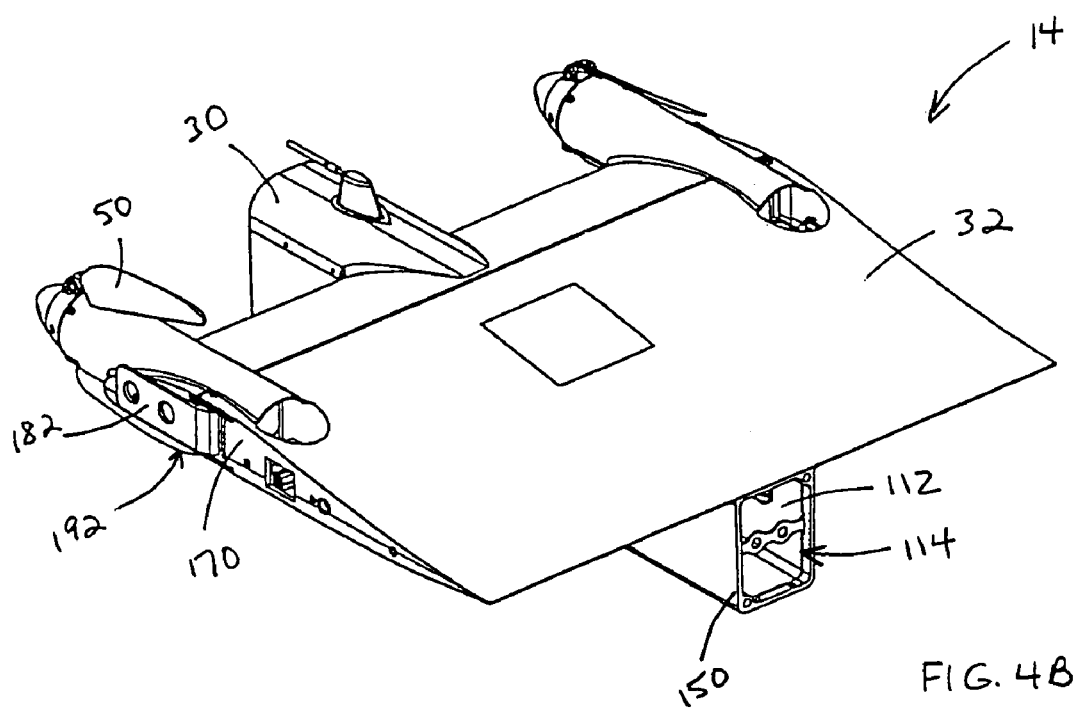

As shown in FIG. 4A, the fuselage central body portion 30 extends forwardly from the front edge 46 of the wing-connecting portion 32 and defines a generally rectangular, forwardly-facing front fuselage through-hole 52. Defining and reinforcing the front fuselage through-hole 52 is a front fuselage bulkhead generally designated by the reference numeral 54, as shown in more detail in FIGS. 5A-5D, and discussed more fully hereinafter.

The fuselage central body is equipped with an electronic guidance and control system (not shown), which is based on a computer system with memory, to support programmed autonomous flight. The fuselage central body is also equipped with the necessary communications equipment (not shown), which provides the method of electronic data transfer to and from the UAV.

As shown in FIGS. 2 and 6, the nose cone 16 of the UAV 10 forms an extension of the fuselage central body portion 30. As shown in FIGS. 7A and 7B, the nose cone 16 is equipped with a payload 56 having a surveillance sensor. The payload 56 can range from simple camera surveillance systems to complex tracking systems and targeting systems. With interchangeable and different mission payloads, a single airframe can execute a variety of missions.

In the embodiment shown in FIGS. 7A and 7B, the payload 56 is a television camera with side-looking capability; alternatively, the camera can have a forward-looking orientation. Other payloads can include noses having dual daylight color television, dual low-light television, infrared imager, and chemical-biological agent detector and collector capabilities.

Video and telemetry data from the UAV are transmitted to a ground communication system, preferably using a microwave transmitter and antenna, with the UAV 10 having an effective line-of-sight range of over ten kilometers. The ground communication system may include a high-gain video and telemetry receiver with directional antenna and color LCD video goggle display. Also provided is a UHF uplink receiver and antenna, placing the UAV in signal transmitting communication with a ground-based UHF uplink transmitter, control unit and video monitor within the ground communication system.

The rear portion of the nose cone 16 defines a generally rectangular, rearwardly-facing nose cone through-hole 58 reinforced by a nose cone bulkhead generally designated by the reference numeral 60, as shown in FIG. 6 and, in greater detail, in FIGS. 8A and 8B. The nose cone bulkhead 60 connects to the front fuselage bulkhead 54 of the fuselage central body portion 30, having corresponding mating surfaces to interface therewith. As previously noted, "outer" refers to that side of the bulkhead which interfaces with a corresponding bulkhead, while "inner" refers to that side of the bulkhead which is rigidly mounted to an airframe component part, such as parts 14, 16 and 22.

As shown in FIG. 5A, the front fuselage bulkhead 54 has a generally rectangular frame 62 with rounded corners 64, the upper corners being more rounded than the lower corners in order to correspond with the construction of the front fuselage through-hole 52 into which the bulkhead 54 is mounted. The frame 62 has a flat outer surface 66 and a flat inner surface 68 with the depth of the side wall 70 between the outer and inner surfaces being approximately 0.25 inches. An integrally formed lip 72 extends outwardly from and on the plane of the outer surface 66.

As viewed from the outer surface 66, the upper right hand and lower left hand corners 64a, 64b of the frame 62 are each provided with an inner flange 74 having a generally circular hole 76 therethrough; the upper left and lower right corners could equivalently be used. Alternatively, only one corner, both left or both right corners, or all four corners could be provided with flanges and holes therethrough, but these alternative embodiments are not preferred. Rather, the diagonal placement of the holes ensures balanced alignment of the bulkheads with minimal weight.

Each of the left and right side walls of the frame 62 has an inwardly projecting shoulder portion 78, preferably rounded as shown in FIG. 5D. The shoulder portions 78 are preferably positioned just above the mid-point of the side wall, and the two shoulder portions 78 are preferably horizontally aligned with one another. The bottom wall 71 of the frame 62 is provided with apertures 75 for use in securing the launching clip 26.

As best seen in FIG. 5B, the side wall 70 of the frame 62 is beveled in profile, sloping from the outer side 66 to the inner side 68. When mounted in the front fuselage through-hole 52, the beveled side wall 70 fits within the opening 52 while the lip 72 on the outer surface 66 abuts against the outer edge 80 of the front fuselage opening 52. The airframe 12 is then filled in around the lip 72 with a filler compound similar to body putty, if necessary, to ensure that the outer edge of the lip 72 is flush with the external surface of the fuselage.

As shown in FIG. 8A, the nose cone bulkhead 60 also has a generally rectangular frame 82 with rounded corners 84, the upper corners being more rounded than the lower corners in order to correspond with the construction of the nose cone through-hole 58 into which the nose cone bulkhead 60 is mounted. The frame 82 has a flat outer surface 86 and a flat inner surface 88 with the depth of the side wall 90 between the outer and inner surfaces being approximately 0.25 inches. An integrally formed lip 92 extends outwardly from and on the plane of the outer surface 86. As best seen in FIG. 8B, the frame 82 of the nose cone bulkhead 60 is also beveled in profile, sloping from the outer side 86 to the inner side 88.

As viewed from the inner surface 88 when mounted, the upper right hand and lower left hand corners 84a, 84b of the frame 82 are each provided with an inner flange 94 having a generally circular hole 96 therethrough. As with the front fuselage bulkhead, the arrangement of the flanges and openings can vary, with the requirement that the holes in the mating bulkheads correspond with one another. Adjacent both upper corners is also a second flange 95 having openings 97 therethrough for use in securing the electrical connectors and wiring passing from the nose cone to the fuselage.

Fitted within each of the holes 96 is a plastic alignment stud or button 98 that projects beyond the outer surface 86, as best seen in FIG. 7B. The projecting portion is preferably conical, although other shapes could also be used. The alignment stud 98 fits within the corresponding holes 76 in the front fuselage bulkhead 54 when the two bulkheads are coupled together and assists in ensuring the proper alignment between the coupled bulkheads 60 and 54. Accordingly, the conical shape of the stud 98 facilitates alignment with the holes 76 in the front fuselage bulkhead 54 for ease in assembly.

Mounted on each of the left and right sides of the frame 82 of the nose cone bulkhead 60 is a clip 100, as shown in FIG. 6. As shown in FIGS. 9A and 9B, the clips 100 are made of a flexible material, such as nylon, plastic, natural delrin, etc. Each of the clips is secured to the frame with a pair of screws 102 inserted through apertures 101 in the clip and spaced openings 104 in the frame side wall 90. The clips 100 have a beveled end 106 and a concave portion 108 with a curvature suited to accommodate the shoulder portions 78 of the front fuselage bulkhead 54 when connected thereto. The beveled end 106 facilitates the flexing of the clip 100 over the shoulder portion 78 necessary to bring the front fuselage bulkhead 54 and nose cone bulkhead 60 into contact, at which point the engagement of the concave portions 108 with the shoulder portions 78 secures the bulkheads, and their corresponding airframe components, together.

When the nose cone bulkhead 60 is mounted in the nose cone through-hole 58, the beveled side wall 90 of the frame 82 fits within the opening 58 while the lip 92 abuts against the outer edge 110 of the nose cone opening 58. The airframe is then filled in around the lip 92, if necessary, to ensure that the outer edge of the lip is flush with the external surface of the nose cone. The beveling of the frame wall combined with the lip ensures a snug fit with the airframe structures and secures the position of the bulkheads thereon.

At the rear of the fuselage central body portion 32 is a generally rectangular, rearwardly-facing rear fuselage through-hole 112 reinforced by a rear fuselage bulkhead generally designated by the reference numeral 114, as shown in FIG. 4B. The rear fuselage bulkhead 114 is shown in detail in FIGS. 10A-10E, and is discussed more fully hereinafter.

The tail section 22 of the UAV 10 includes a vertically oriented stabilizer 116 and a tail body portion 118 that connects to the rear of the fuselage central body portion 30 (see FIG. 2). The tail section 22 is equipped with an antenna 120 attached along the forward edge 122 of the stabilizer 116 in a manner that is known in the art.

Figure 11B:
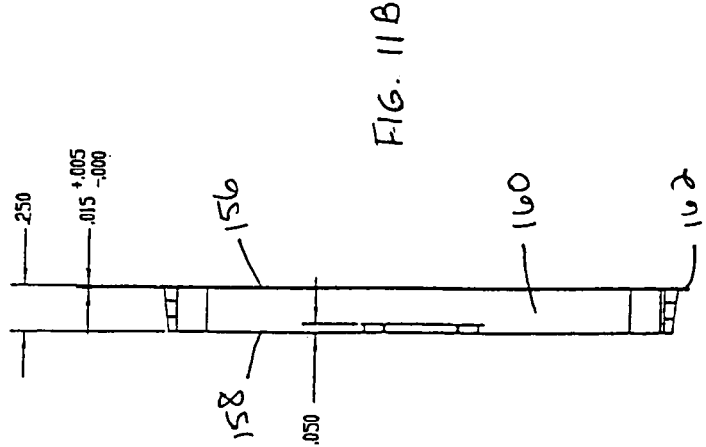
FIGS. 11A-11C are the inner, side and top views, respectively, of the tail section bulkhead for the tail section shown in FIG. 2.
Figure 11A:
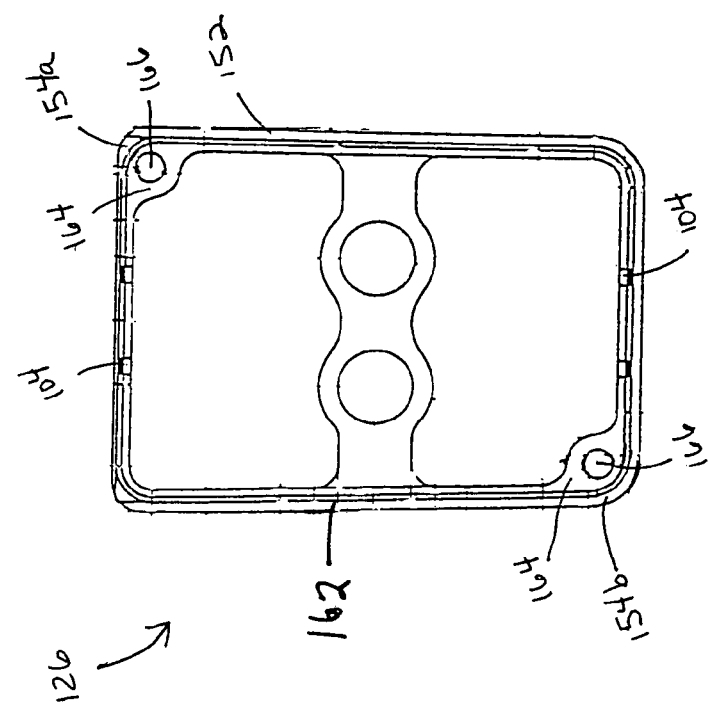
Figure 11C:
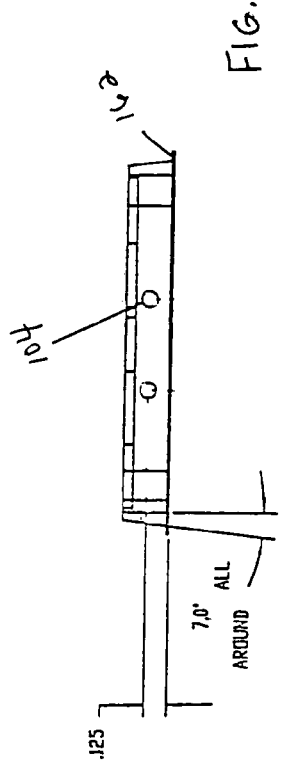

The tail body portion 118 extends forwardly from the forward edge 122 of the vertical stabilizer 116 and defines a generally rectangular, forwardly-facing tail section through-hole 124 that is reinforced by a tail section bulkhead generally designated by the reference numeral 126, which is shown in detail in FIGS. 11A-11C. The tail section bulkhead 126 is designed to be coupled to the rear fuselage bulkhead 114, having corresponding mating surfaces to interface therewith.

More specifically, as shown in FIG. 10A, the rear fuselage bulkhead 114 has a generally rectangular frame 132 with rounded corners 134 to correspond with the construction of the rear fuselage through-hole 112 into which the bulkhead 114 is mounted. The frame 132 has a flat outer surface 136 and a flat inner surface 138 with the depth of the side wall 140 between the outer and inner surfaces being approximately 0.25 inches. An integrally formed lip 142 extends outwardly from and on the plane of the outer surface 136.

As viewed from the inner surface in FIG. 10A, the upper left hand and lower right hand corners 134a, 134b of the frame 132 are each provided with an inner flange 144 having a generally circular hole 146 therethrough; the upper right hand and lower left hand corners could equivalently be used. Alternatively, only one corner, both left or both right corners, or all four corners could be provided with flanges and holes therethrough, but these alternative embodiments are not preferred. Rather, the diagonal placement of the holes ensures balanced alignment of the bulkheads with minimal weight.

Each of the upper and lower sides of the frame 132 has an inwardly projecting rounded shoulder portion 148, as shown in FIG. 10E. The shoulder portions 148 are preferably positioned midway along the upper and lower sides, and the two shoulder portions 148 are preferably vertically aligned with one another. As best seen in FIG. 10B, the frame 132 is beveled in profile, sloping from the outer side 136 to the inner side 138. When mounted in the rear fuselage through-hole 112, the beveled side wall 140 fits within the opening 112 while the lip 142 abuts against the outer edge 150 of the opening 112 (see FIG. 4B). The airframe is then filled in around the lip, if necessary, to ensure that the outer edge of the lip is flush with the external surface of the fuselage.

As shown in FIG. 11A, the tail section bulkhead 126 also has a generally rectangular frame 152 with rounded corners 154 in order to correspond with the construction of the tail section through-hole 124 into which the tail section bulkhead 126 is mounted. The frame 152 has a flat outer surface 156 and a flat inner surface 158 with the depth of the side wall 160 between the outer and inner surfaces being approximately 0.25 inches. An integrally formed lip 162 extends outwardly from and on the plane of the outer surface 156.

As viewed from the inner surface when mounted as shown in FIG. 11A, the upper right hand and lower left hand corners 154a, 154b of the frame 152 are each provided with an inner flange 164 having a generally circular hole 166 therethrough. As with the rear fuselage bulkhead 114, the arrangement and number of the flanges and openings can vary, with the requirement that the holes in the mating bulkheads correspond with one another.

Fitted within each of the holes 166 in the tail section bulkhead 126 is an alignment stud or button 98 of the same type used in the nose cone bulkhead 60 already described. The alignment stud 98, preferably with a conical projecting portion, fits within the corresponding holes 146 in the rear fuselage bulkhead 114 when the two bulkheads are coupled together and assists in ensuring the proper alignment between the coupled bulkheads 126 and 114.

Mounted on each of the upper and lower sides of the frame 152 of the tail section bulkhead 126 is a clip 100 (see FIG. 2) of the same type used in the connection between the front fuselage bulkhead and the nose cone bulkhead, as shown in FIGS. 9A and 9B. As already described hereinabove, the beveled ends 106 of the clips 100 facilitate the flexing of the clips over the shoulder portions 148 necessary to bring the bulkheads 114 and 126 into contact with one another, at which point the engagement of the concave portions 108 with the shoulder portions 148 secures the two bulkheads, and their corresponding airframe components, together. Each of the clips 100 is secured to the frame 152 with a pair of screws 102 inserted through apertures 101 in clip 100 and spaced openings 104 in the frame wall 160.

As best seen in FIG. 11B, the frame 152 of the tail section bulkhead 126 is also beveled in profile, sloping from the outer side 156 to the inner side 158. When mounted in the tail section in through-hole 124, the beveled side wall 160 fits within the opening 124 while the lip 162 abuts against the outer edge 168 of the opening 124. The airframe is then filled in around the lip, if necessary, to ensure that the outer edge of the lip 162 is flush with the outer surface of the tail section.

The beveling of the frame wall combined with the abutment of the lip against the airframe outer wall ensures a snug fit in the through-holes of the airframe structures and secures the position of the bulkheads therein. The bulkheads are preferably made of aluminum, and may be provided with a protective coating such as medium-gold iridite.

With the connection of the nose cone 16 and the tail section 22 to the fuselage 14, the body of the UAV 10 is complete. Electrical connectors are included in conjunction with each of the mating bulkhead connections in order to provide the necessary communication and control functions throughout the resulting structure. Examples of these may include the radio frequency connections needed to connect the video transmitter and the command receiver to the tail-mounted antennas, electrical connection to the servos in the wings, and electrical connection to the nose cone to provide the payload with power and to accept the return signal, e.g., video, from the payload.

On either side of the fuselage 14, the inner wing rib assembly 40 provides a wing-mounting side surface 170. As shown in FIG. 12, the wing-mounting side surface 170 includes a plurality of generally circular openings 172 and 174, and two generally rectangular apertures 176 and 178. In the first of the generally rectangular apertures 176, a recessed spar pivot mounting rod 180 is provided, as shown in FIGS. 13A, 13B and 13C. The pivot mounting rod 180 is designed to fit vertically in a pair of aligned holes 181 in the stub spar mount 38 on each end of the main spar assembly 36 (see FIG. 3).

A wing spar or support, generally designated by the reference numeral 182 and shown in FIGS. 14A, 14B and 14C, has a pivot portion 184 and a generally planar portion 186 extending therefrom. The wing spar 182 is removably coupled to the fuselage on each side using the pivot portion 184. More specifically, the pivot portion 184, which is generally cylindrical with a longitudinally extending gap 188, is inserted into the aperture 176, flexed to expand the gap 188 and then snapped over the spar pivot mounting rod 180. The wing spars 182 are preferably made of nylon and are designed to break free from the spar pivot rods 180 upon torsion caused by impact. The spars 182 are readily reused or, if necessary, replaced by reconnecting the pivot portion 184 to the spar pivot mounting rod 180. The planar portion 186 is rotatable from an outwardly extended wing-mounting position, generally designated by the reference numeral 190 and representatively shown in FIG. 12, to a storage position, generally designated by the reference numeral 192, in which the planar portion is flush against the wing mounting side surface 170, as shown in FIGS. 4A and 4B.

The second generally rectangular opening 178 provides access to a bulkhead connector 196 for connecting the electrical wiring necessary to operate the flight controls mounted on the wing pieces as will be described hereinafter.

The plurality of generally circular openings 172 and 174 includes two circular apertures 172 spaced on either side of both generally rectangular openings, each circular opening 172 having a metal liner element 198 to define and reinforce the openings. In addition, a third smaller circular opening 174 is provided closer to the rear edge 42 of the wing-connecting portion 32 of the fuselage 14.

The left and right wing pieces are attached to the wing-mounting side surfaces 170 of the fuselage. The wings are preferably made of a composite material which may include the use of epoxy, Kevlar, fiberglass, carbon (graphite) fiber, or other materials as dictated by structural requirements.

Figure 15A:
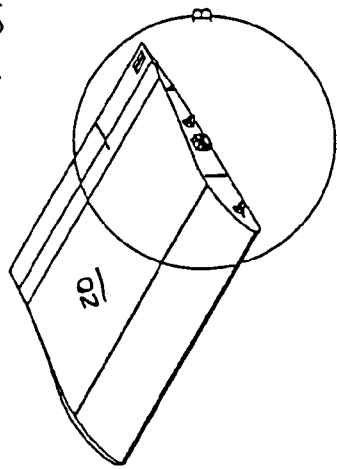
FIGS. 15A and 15B illustrate the wing piece and an enlarged view of the fuselage mounting side surface of the wing piece, respectively, of the UAV shown in FIG. 2 in accordance with the present invention.
Figure 15B:
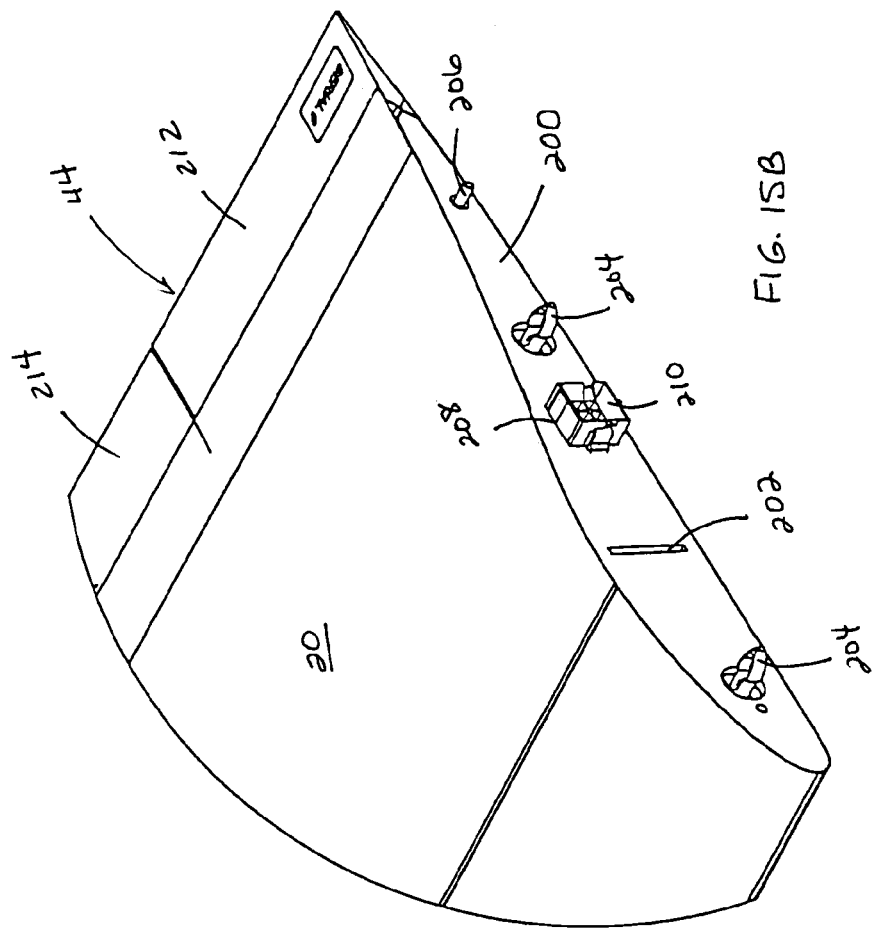
Figure 16:
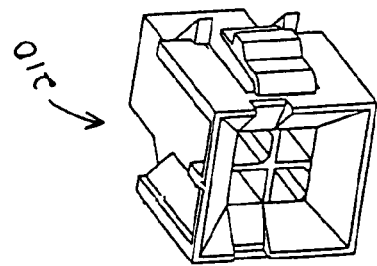
FIG. 16 is an enlarged view of the electrical connector for the wing piece shown in FIGS. 15A and 15B.

The wing pieces 18 and 20 attach to opposite sides of the fuselage 14 to extend laterally therefrom. As shown in FIGS. 15A and 15B, each wing piece has a fuselage-mounting side surface 200 that is provided with a spar-receiving opening 202 into which the wing spars 182 on the fuselage are inserted to mount the wing pieces. Also provided on the fuselage-mounting side surfaces 200 of the wing pieces are a pair of keyhole rivets 204, spaced to correspond with the two metal-lined circular openings 172 of the wing-mounting side surface 170, and an alignment post 206 spaced to correspond with the third opening 174. The fuselage-mounting side surface 200 further includes a generally rectangular aperture 208 through which an electrical connector 210 projects for attachment to the corresponding electrical connector 196 in the fuselage 14. The connector 210 is representatively shown in FIG. 16, although any suitable connector style may be used.

When mounting the wing pieces 18 and 20 to the fuselage 14, the wing spars 182 are inserted into the spar receiving openings 202, the keyhole rivets 204 are snapped into the two metal-lined circular apertures 172, and the alignment post 206 is inserted into the third opening 174. The spar 182 provides torsional support for the wing piece, being strengthened by the pivot mounting rod 180, the main spar assembly 36 and stub spar mount 38, as shown in FIG. 3. The rivets 204, spar receiving opening 202 and post 206 ensure that the wing piece is mounted securely and in proper alignment.

Figure 17:
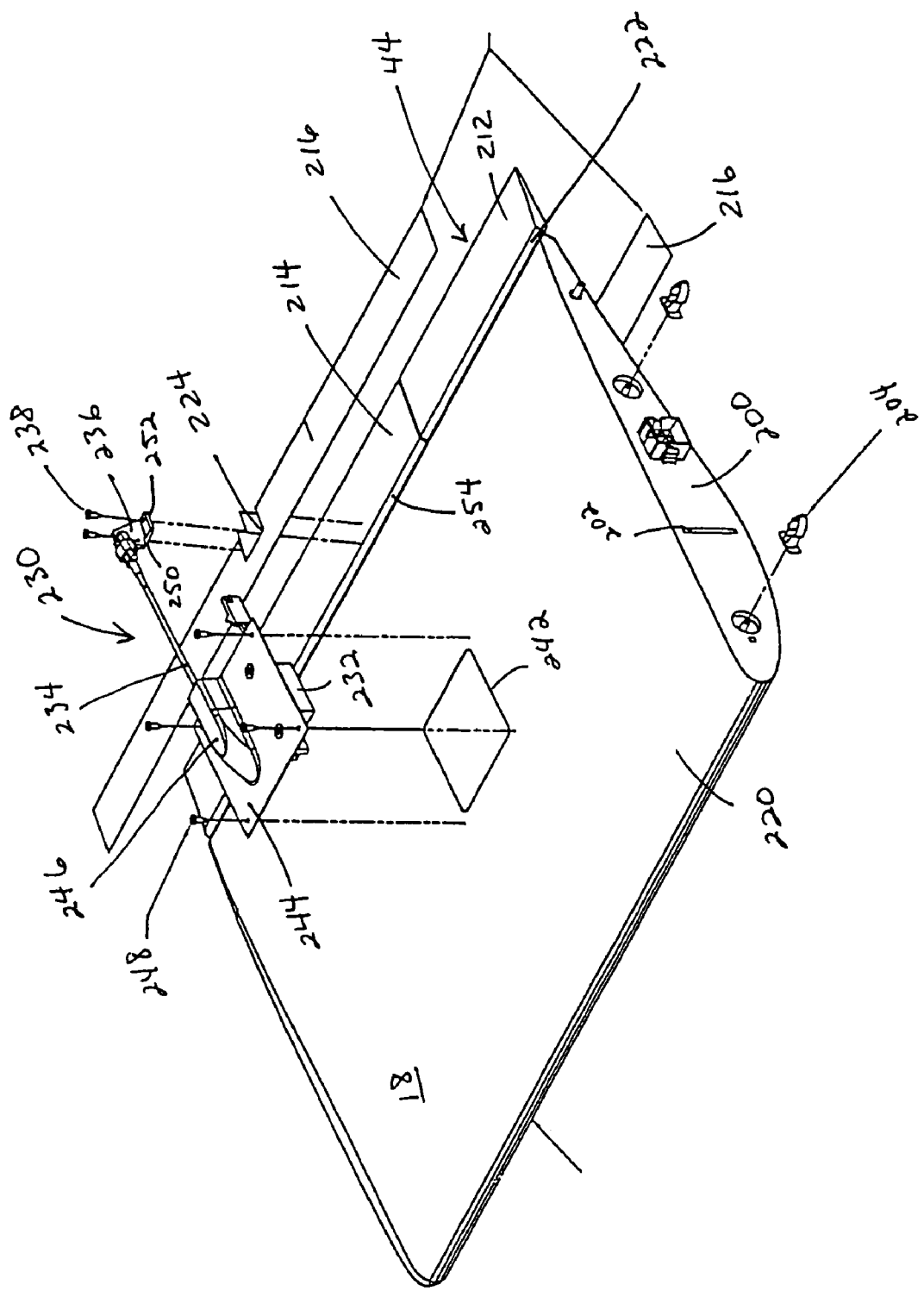
FIG. 17 is an exploded view of the underneath side of a wing piece of the UAV of FIG. 2 showing a servo assembly in accordance with the present invention.

As illustrated in FIGS. 17-20A, the trailing edge 44 of the wing piece 18 includes a fixed portion 212 and a movable control surface or elevon 214. The fixed portion 212 may be formed integrally with the wing piece 18 or may be attached thereto. A strip of tape 216 is affixed to both the upper surface 218 and the lower surface 220 of the wing piece to cover the joint 222 between such surfaces and the fixed portion and elevon, as illustrated in FIG. 17. The tape 216 affixed to the lower surface 220 of the wing piece has a notch 224 therein to accommodate the servo assembly, generally designated by the reference numeral 230.

As further shown in FIGS. 19, 20 and 20A, the servo assembly 230 includes a servo 232 mounted on the lower surface 220 of the wing piece and coupled to a push-rod 234 for controlling the angle of the elevon 214. The push-rod 234 is hingedly connected to the elevon 214 through a control horn 236 which is secured to the elevon with fastening elements 238. The servo 232 moves the push-rod 234 back and forth which, in turn, moves the elevon 214 up and down along the joint 222 via the hinge connection 240 of the push-rod 234 to the control horn 236. The control signals to the servos 232 are provided through conventional quick release electrical connectors and cables with wiring running from the fuselage 14, as would be known by persons of ordinary skill in the art.

When mounting the servo assembly 230, a cutout 242 is provided in the lower surface 220 of the wing piece to accommodate the servo 232, as shown in FIG. 17. A servo cover 244 with a raised center portion 246 to accommodate the servo overlies and secures the servo to the lower surface 220 of the wing piece using fastening elements 248. The control horn 236 is positioned on the elevon 214 such that the push-rod 234 is perpendicular to the trailing edge 44 of the wing piece and the front edge 250 of the base 252 of the horn 236 is even with the front edge 254 of the elevon 214. By mounting the servos 232 on the wing pieces 18 and 20 as described and illustrated, the push-rods 234 can be short and direct, providing improved and more responsive control over the elevons 214 than is possible with conventional fuselage-mounted servos. Flight stability is also enhanced as compared with conventional fuselage-mounted servos which often produce oscillation during flight.

As shown in FIG. 2, the UAV 10 includes an improved launching clip 26 which is mounted on the bottom of the fuselage and secured therethrough with fastening elements 256 passing through apertures 264 (see FIGS. 21A, 21B, 22A and 22B) to a mounting plate 28 on the inner surface of the fuselage adjacent the front fuselage through-hole 52. The mounting plate 28 has apertures 265 to receive fastening elements 256, and beveled edges 258 to reduce any obstruction of the fuselage opening. The mounting plate is preferably made of aluminum.

As shown in FIGS. 22A and 22B, the launching clip 26 has a flush mounting portion 260 and a launch hook 262 which projects outwardly and then bends in a rearward direction to extend generally parallel with the mounting portion 260. The mounting portion 260 is secured to the mounting plate 28 through the fuselage and apertures 264 with fastening elements 256. In addition, fastening elements 257 are inserted through the apertures 75 in the front fuselage bulkhead frame 62 to provide greater stability in the mounting of the launching clip.

As best seen in FIG. 22B, the launch hook 262 has a low profile including a beveled forward edge 27 that reduces the rapid deceleration of the UAV which might otherwise result from a projecting launch structure digging into a yielding surface such as mud, grass, loose soil, etc. Given the stress to which the launching clip is subjected, it is preferably made of annealed spring steel.

Figure 24:
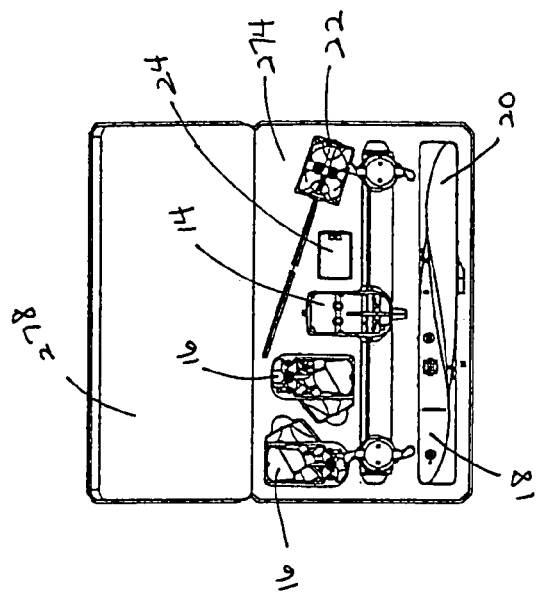
FIG. 24 depicts a top view of the transport case of FIG. 23, with the component parts stored therein.
Figure 23:
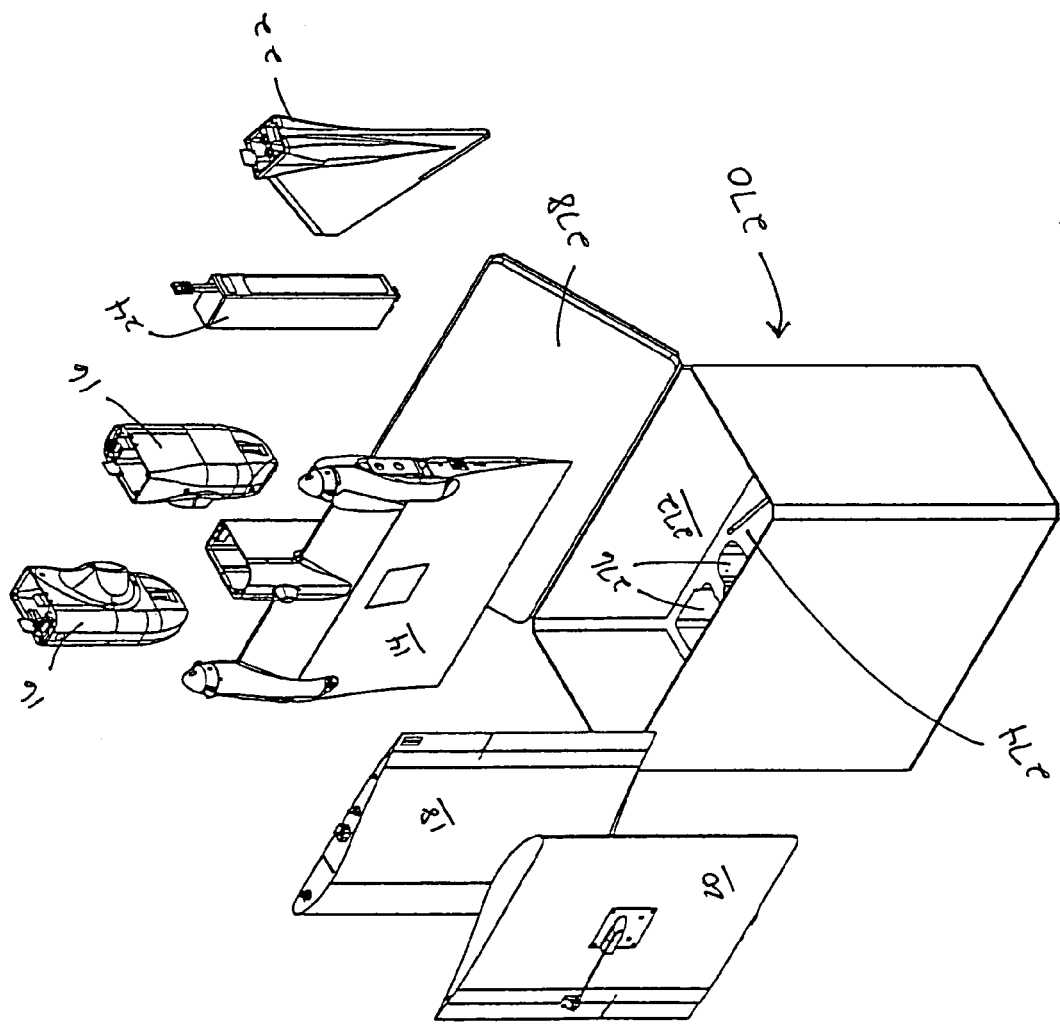
FIG. 23 illustrates a perspective view of a first embodiment of a transport case for storage of the UAV, shown with the component parts of the UAV as disassembled and ready for storage in accordance with the present invention.

As representatively illustrated in FIGS. 23-25, the UAV of the present invention may be conveniently packed and carried in a back-packable transport case that is less than eighteen inches in length and height, and approximately 10 inches in depth or cross section. This transport case may be carried to the field very easily, the UAV weighing only about six and a half pounds, where the aircraft component parts can be removed for rapid assembly and hand launch.

According to a first embodiment as shown in FIGS. 23 and 24, the transport case, generally designated by the reference numeral 270, has a compartment area 272 that is partially filled with an impact absorbing insert 274 having specially sized cutouts 276 therein to accommodate the various components. This insert 274 may be a foam-type cushioning element or other comparable structure. Once the components (including preferably two nose cones 16) are inserted into their respective cutouts 276 with a friction fit, as shown in FIG. 24, the lid 278 may be closed and the case 270 easily carried in a backpack. The case itself may be provided with straps (not shown) to enable the user to place the case upon one's back for transport as a self-contained backpack. The outer shell of the case is preferably waterproof.

In a second embodiment of the transport case illustrated in FIG. 25, the transport case, generally designated by the reference numeral 280, has a hard outer shell 282 with a body 284 and a hinged lid 286. The compartment area 288 within the body 284 is separated into a fuselage side 290 and a wing piece side 292 by a corrugated divider element 294 that further defines within itself a sleeve 296 for receipt of the stabilizer portion 116 of the tail section 22 when the latter is oriented as shown in FIG. 25.

The fuselage side 290 of the divided compartment 288 is provided with a foam-type cushioning insert 298 having specially formed nose cone cutouts 300 and fuselage cutout 302 therein to accommodate the fuselage and nose cones and hold the same with a friction fit. The wing piece side 292 of the divided compartment 288 is generally open, but is also preferably lined with a foam cushioning layer 304, and is sized to receive both wing pieces when the latter are juxtaposed as shown in FIG. 25. The sleeve 296 has a relatively narrow top opening 306 enclosed by the two corrugated sides of the divider element 294.

Accordingly, when the component parts are disassembled, the wing pieces 18 and 20, the fuselage 14, the tail section 22 and the nose cones 16 are interfitted alongside one another in the transport case 280, the length of the transport case being less than the overall wing span of the UAV 10 when assembled. More specifically, the nose cones 16 are fitted within their respective cutouts 300, after which the fuselage main body is inserted within the corresponding fuselage cutout 302. The wing pieces 18 and 20 are stacked and placed into the wing piece 292 side, and the stabilizer 116 of the tail section is inserted into the divider element 294. Hence, the wing pieces, tail section and fuselage are aligned against one another so as to be in a generally vertically-oriented stacked arrangement within the transport case 280, with the nose cones 16 being offset to one side of the central body portion 30 of the fuselage 14, as illustrated in FIG. 25.

Preferably, two nose cones 16 with alternate payloads are included in the transport case 280, such as one having a downward-facing lens and the other with a side-mounted lens, each nose cone occupying a respective nose cone cutout 300 offset to the left and right of the fuselage cutout 302. When the stabilizer portion 116 of the tail section 22 is inserted into the sleeve 296, the body portion 118 of the tail section 22 is offset from the central body portion 30 of the fuselage 14, resting adjacent the front edge 46 of the wing connecting portion 32 thereof.

The lid 286 of the case 280 is also provided with an inner lining 308 of shock-absorbing material to protect the upper portions of the components when the lid is closed. The case and the components therein are further protected by a waterproof outer bag 310 that fits snugly against and fully encloses the hard-shell case for all-weather protection. The bag 310 may be provided with shoulder straps (not shown) for use as a self-contained backpack.

The present invention has a robust, lightweight construction with an electric drive that provides a long shelf life, ease of starting, and on-off capability in flight for silent operation. The components are easily assembled into aircraft flight configuration at or near the launch site and launched in less than fifteen minutes from a cold start. The UAV is then capable of nearly fully autonomous operation with minimal human in-the-loop requirements. The UAV operates unobtrusively at an altitude of about 300 feet to enable acquisition of overhead daylight, lowlight or infrared imagery from a range of up to about 10 km. Upon return, the system can be broken down into the component parts and packed into the transport case in less than two minutes.

With the quick-connecting bulkhead structures and breakaway features as described herein, the UAV in accordance with the present invention is able to absorb and dissipate impact loads incurred when hitting the ground so as to avoid damage to the airframe component parts. As a result, upon separation of the components due to impact, the UAV may be readily reassembled for nearly immediate redeployment. The UAV also demonstrates improved flight stability and control through the wing-mounted servos, as well as smoother landing transitions produced by the low-profile launching structure.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A modular hand-launchable unmanned aerial vehicle (UAV) comprising:
   a plurality of modules including a fuselage, a nose cone, a tail section and two wing pieces, said modules being readily assembled to construct said UAV and being readily disassembled for compact transport;
   a front side and a rear side of said fuselage having a forwardly-facing fuselage through-hole and a rearwardly-facing fuselage through-hole, respectively;
   said nose cone having a rearwardly-facing nose cone through-hole for coupling to said forwardly-facing fuselage through-hole;
   said tail section having a forwardly-facing tail section through-hole for coupling to said rearwardly-facing fuselage through-hole;
   each of said two wing pieces having a fuselage-mounting surface for coupling to a wing-mounting surface on a respective side of said fuselage;
   each of said through-holes being defined and reinforced with a bulkhead mounted in a respective one of said through-holes, said bulkhead fitting cooperatively with a mating bulkhead on a corresponding one of said fuselage, nose cone and tail section modules.

2. The UAV as set forth in claim 1, wherein for each pair of mating bulkheads, a first bulkhead of said pair includes two opposing side walls each having an inner surface provided with a shoulder portion, and a second bulkhead of said pair includes a pair of clips positioned to be in alignment with said shoulder portions, each of said clips having a concave portion to accommodate said shoulder portions, respectively, and thereby secure said pair of bulkheads, as well as the corresponding modular components to which the bulkheads are mounted, against one another when the UAV is assembled.

3. The UAV as set forth in claim 1, wherein for each pair of mating bulkheads, a first bulkhead of said pair includes a diagonal pair of projecting alignment structures on the outer surface thereof, and a second bulkhead of said pair includes a diagonal pair of apertures positioned to be in alignment with said projecting alignment structures, respectively.

4. The UAV as set forth in claim 3, wherein each of said projecting alignment structures includes a conical portion and each of said apertures is generally circular.

5. The UAV as set forth in claim 1, further comprising a launch clip mounted on a lower surface of said fuselage, said launch clip having a beveled forward edge for reduced profile and a mounting plate secured to the fuselage through the bulkhead mounted in said forwardly-facing fuselage through-hole.

6. The UAV as set forth in claim 1, wherein a break-away wing spar is pivotally coupled to a mounting rod at the wing-mounting surface on each side of said fuselage, said wing spar having an extended wing-mounting position for connection of the wing pieces in operation and a folded storage position so as to be flush against said wing-mounting surface when disassembled.

7. The UAV as set forth in claim 6, wherein each of said wing pieces has a fuselage-mounting surface with an opening therein for receiving said wing spar in said extended wing-mounting position.

8. The UAV as set forth in claim 7, further comprising a plurality of openings in said wing-mounting surface and a plurality of corresponding projections on said fuselage-mounting surface for insertion into said openings to secure removable connection of said wing pieces to said fuselage.

9. The UAV as set forth in claim 1, wherein each wing piece includes a servo mounted on a lower surface thereof, said servo being coupled to a push rod that is hingedly connected to a corresponding elevon of said wing piece for control thereof.

10. The UAV as set forth in claim 9, wherein said push-rod is generally perpendicular to a trailing edge of said wing piece.

11. The UAV as set forth in claim 1, wherein said plurality of modular components when disassembled fit within a compact transport case of a size that can be carried as a backpack by one person.

12. The UAV as set forth in claim 11, wherein said transport case is less than eighteen inches in height and length, and approximately ten inches in depth.

13. The UAV as set forth in claim 11, wherein said transport case includes a compartment area with an opening thereto and a lid for closing said opening, said compartment area being partially filled with an impact absorbing insert having a plurality of specially sized cutouts therein to accommodate said plurality of UAV modules, respectively, said modules being inserted through said opening and fitting into their respective cutouts in said compartment area with a friction fit.

14. The UAV as set forth in claim 13, wherein said compartment is separated into a fuselage side and a wing piece side by a divider element, said fuselage side being prdvided with a foam-type cushioning insert having specially formed nose cone cutouts and fuselage cutout therein to accommodate and hold the fuselage and at least one nose cone with a friction fit, and said wing piece side being generally open and sized to receive both wing pieces in a juxtaposed relationship.

15. The UAV as set forth in claim 14, wherein said divider element further defines within itself a sleeve for receipt of a stabilizer portion of the tail section, said sleeve having a relatively narrow top opening enclosed by sides of the divider element.

16. The UAV as set forth in claim 1, wherein said UAV weighs about six and a half pounds.

17. The UAV as set forth in claim 1, wherein each of said bulkheads has a generally rectangular frame including a flat outer surface and a flat inner surface joined by a side wall that is generally perpendicular to said inner and outer surfaces, said outer surface having an integrally formed lip extending outwardly and on a same plane therewith such that, when said bulkhead side wall is adjacent an inner wall of a corresponding through-hole, said lip abuts against an outer edge of said through-hole.

18. The UAV as set forth in claim 17, wherein a width of said side wall between said outer and inner surfaces is about 0.25 inches.

19. The UAV as set forth in claim 17, wherein each of said bulkheads is further provided with at least one of an aperture and a projecting alignment structure, each of which fits cooperatively with a complementary projecting alignment structure and aperture, respectively, on the mating bulkhead to facilitate rapid and accurate alignment of the mating bulkheads during assembly of the modules.

20. The UAV as set forth in claim 17, wherein said side wall is beveled to slope from said outer surface to said inner surface.

* * * * *

UNITED STATES PATENT AND TRADEMARK OFFICE
CERTIFICATE OF CORRECTION

PATENT NO. : 7,237,750 B2
APPLICATION NO. : 10/976153
DATED : July 3, 2007
INVENTOR(S) : Tien Seng Chiu et al.

It is certified that error appears in the above-identified patent and that said Letters Patent is hereby corrected as shown below:

Title Page

Item (75) Inventors add

Kirk Jenkins, Trappe, MD (US)

Signed and Sealed this

Fourth Day of March, 2008

JON W. DUDAS
*Director of the United States Patent and Trademark Office*